(12) United States Patent
Wijayanathan et al.

(10) Patent No.: US 7,933,581 B2
(45) Date of Patent: Apr. 26, 2011

(54) METHODS AND APPARATUS FOR USE IN PROCESSING DISCONNECTED EMERGENCY CALLS AND OTHER COMMUNICATIONS INVOLVING MOBILE COMMUNICATION DEVICES AND THE REMOTE MONITORING THEREOF

(75) Inventors: Maiyuran Wijayanathan, Waterloo (CA); Noushad Naqvi, Waterloo (CA); Ingo W. Weigle, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 960 days.

(21) Appl. No.: 11/760,120

(22) Filed: Jun. 8, 2007

(65) Prior Publication Data
US 2008/0305763 A1 Dec. 11, 2008

(51) Int. Cl.
*H04M 11/04* (2006.01)
(52) U.S. Cl. .................. 455/404.2; 455/404.1; 455/458; 455/567; 379/45; 340/7.59
(58) Field of Classification Search ............... 455/404.1, 455/404.2, 456.1, 450, 418, 567, 458; 379/45
See application file for complete search history.

(56) References Cited

U.S. PATENT DOCUMENTS

| | | | | |
|---|---|---|---|---|
| 5,323,444 | A | * | 6/1994 | Ertz et al. ................... 379/45 |
| 5,479,482 | A | * | 12/1995 | Grimes ...................... 455/556.1 |
| 5,598,460 | A | * | 1/1997 | Tendler ...................... 455/404.2 |
| 5,689,548 | A | * | 11/1997 | Maupin et al. ............. 455/404.1 |
| 5,740,532 | A | * | 4/1998 | Fernandez et al. ......... 455/404.1 |
| 5,937,344 | A | * | 8/1999 | Zicker ....................... 455/404.1 |
| 6,032,040 | A | | 2/2000 | Choy et al. |
| 6,240,284 | B1 | * | 5/2001 | Bugnon et al. ............ 455/404.1 |

(Continued)

FOREIGN PATENT DOCUMENTS

EP 1124395 A1 8/2001

(Continued)

OTHER PUBLICATIONS

European Search Report for Application #07109922.0 dated Oct. 12, 2007.

(Continued)

*Primary Examiner* — Sharad Rampuria
(74) *Attorney, Agent, or Firm* — John J. Oskorep, Esq.

(57) ABSTRACT

Methods and apparatus for use in processing disconnected emergency calls and other communications involving mobile communication devices, as well as the remote monitoring of such mobile communication devices, are disclosed. In one illustrative example, an emergency call with a public safety answering point entity is established by a mobile communication device via a wireless communication network. If the emergency call is disconnected, the mobile device monitors to receive an incoming call message for a continued emergency call from the public safety answering point entity. In response to receiving such incoming call message, the mobile device refrains from producing an audible alert and automatically answers the continued emergency call from the public safety answering point entity without detecting any manual answer signal via its user interface. In one specific approach, the mobile device answers the call automatically if the incoming call message is received within a time period following the disconnection and a data indication of the incoming call message indicates that the message is for the continued emergency call or automatic answering. Otherwise, if the incoming call message is received outside of the time period following the disconnection, or if the data indication fails to indicate that the incoming call message is for the continued emergency call or the automatic answering, the mobile device refrains from automatically answering the call associated with the incoming call message.

30 Claims, 6 Drawing Sheets

U.S. PATENT DOCUMENTS

| | | | |
|---|---|---|---|
| 6,249,674 B1 * | 6/2001 | Verdonk | 455/404.1 |
| 6,256,489 B1 * | 7/2001 | Lichter et al. | 455/404.2 |
| 6,385,302 B1 * | 5/2002 | Antonucci et al. | 379/45 |
| 6,556,816 B1 * | 4/2003 | Gafrick et al. | 455/404.1 |
| 6,724,860 B2 * | 4/2004 | Stumer et al. | 379/45 |
| 6,980,799 B2 | 12/2005 | Akhteruzzaman et al. | |
| 6,990,328 B2 * | 1/2006 | Crandall et al. | 455/404.1 |
| 6,990,349 B1 * | 1/2006 | Idrissi | 455/450 |
| 7,016,478 B2 * | 3/2006 | Potorny et al. | 379/49 |
| 7,050,785 B2 | 5/2006 | Islam et al. | |
| 7,127,044 B1 * | 10/2006 | Becker et al. | 379/45 |
| 7,177,397 B2 * | 2/2007 | McCalmont et al. | 379/45 |
| 7,177,623 B2 * | 2/2007 | Baldwin | 455/404.2 |
| 7,228,145 B2 | 6/2007 | Burritt et al. | |
| 7,340,241 B2 * | 3/2008 | Rhodes et al. | 455/404.1 |
| 7,463,880 B2 * | 12/2008 | Bandaru | 455/414.1 |
| 7,486,949 B2 * | 2/2009 | Ignatin | 455/414.1 |
| 7,565,130 B2 * | 7/2009 | Chin et al. | 455/404.1 |
| 7,676,215 B2 * | 3/2010 | Chin et al. | 455/404.1 |
| 7,706,356 B1 * | 4/2010 | Olshansky et al. | 370/352 |
| 7,715,821 B2 * | 5/2010 | Rollender | 455/404.1 |
| 2002/0090947 A1 | 7/2002 | Brooks et al. | |
| 2004/0257274 A1 | 12/2004 | Benco et al. | |
| 2005/0063519 A1 * | 3/2005 | James | 379/45 |
| 2006/0003775 A1 | 1/2006 | Bull et al. | |
| 2007/0207839 A1 * | 9/2007 | Buti et al. | 455/567 |
| 2007/0213100 A1 | 9/2007 | Osann, Jr. | |

FOREIGN PATENT DOCUMENTS

| | | |
|---|---|---|
| EP | 1950915 A1 | 7/2008 |
| GB | 2339998 A | 2/2000 |
| WO | 0019744 A1 | 4/2000 |
| WO | 0049829 A1 | 8/2000 |
| WO | 0147290 A2 | 6/2001 |
| WO | 0195660 A1 | 12/2001 |
| WO | 2007118207 A1 | 10/2007 |

OTHER PUBLICATIONS

International Search Report and Written Opinion, PCT Application # PCT/CA2008/001090, Nov. 4, 2008.

* cited by examiner

METHODS AND APPARATUS FOR USE IN PROCESSING DISCONNECTED EMERGENCY CALLS AND OTHER COMMUNICATIONS INVOLVING MOBILE COMMUNICATION DEVICES AND THE REMOTE MONITORING THEREOF

BACKGROUND

1. Field of the Technology

The present disclosure generally relates to the processing of disconnected emergency calls and other communications involving mobile communication devices operating in wireless communication networks, as well as the remote monitoring of such mobile communication devices.

2. Description of the Related Art

For mobile communication devices, technologies are being developed by wireless service providers at the demand of the Federal Communications Commission (FCC) which are expected to enhance the location-finding ability in Enhanced 911 (E-911), in order to locate the exact position of the mobile device involved in the emergency call.

The FCC is rolling out E-911 in phases. Phase 0 is the basic 911 process, where wireless emergency calls are sent to the appropriate public safety answering point (PSAP). Wireless service providers must direct a call to a PSAP even if the caller is not a subscriber to their service. In Phase 1, the FCC requires that a phone number of the mobile device be displayed with each wireless emergency call, allowing the PSAP operator to call back if there is a disconnection. In Phase 2 (the final phase), the FCC requires that the mobile devices have GPS functionality in order to deliver more specific latitude and longitude information during wireless emergency calls. The location information must be accurate within 50-300 meters.

What are needed are methods and apparatus for processing disconnected emergency calls and other communications of mobile communication devices, as well as the remote monitoring of such devices, in order to facilitate these and other enhancements in wireless communication networks.

DETAILED DESCRIPTION OF THE PREFERRED EMBODIMENTS

Methods and apparatus for use in processing disconnected emergency calls and other communications involving mobile communication devices, as well as the remote monitoring of such mobile communication devices, are described herein. In one illustrative example, an emergency call with a public safety answering point entity is established by a mobile communication device via a wireless communication network. If the emergency call is disconnected, the mobile device monitors to receive an incoming call message for a continued emergency call from the public safety answering point entity. In response to receiving such incoming call message, the mobile device refrains from producing an audible alert and automatically answers the continued emergency call from the public safety answering point entity without detecting any manual answer signal via its user interface. In one specific approach, the mobile device answers the call automatically if the incoming call message is received within a time period following the disconnection and a data indication of the incoming call message indicates that the message is for the continued emergency call or automatic answering. Otherwise, if the incoming call message is received outside of the time period following the disconnection, or if the data indication fails to indicate that the incoming call message is for the continued emergency call or the automatic answering, the mobile device refrains from automatically answering the call associated with the incoming call message.

Figure 1:
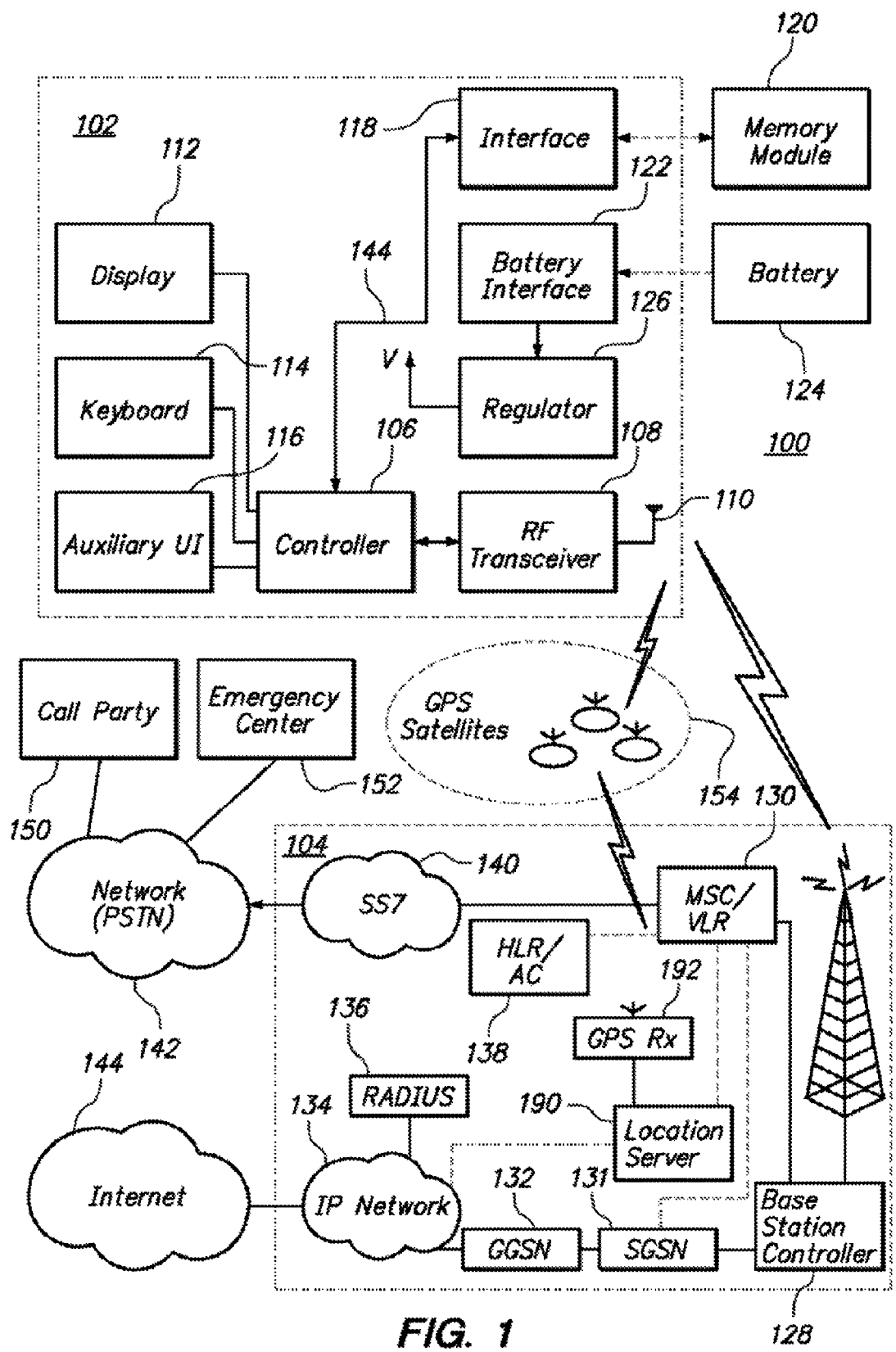
FIG. 1 is a block diagram of a communication system which includes a mobile communication device for communicating via a wireless communication network.

To illustrate basic network architecture which may be utilized, FIG. 1 shows a block diagram of a communication system 100 which includes a mobile station (MS) 102 (one example of a mobile communication device) which communicates via a wireless communication network 104. Mobile station 102 preferably includes a visual display 112, a keyboard 114, and perhaps one or more auxiliary user interfaces (UI) 116, each of which is coupled to a controller 106. Controller 106 is also coupled to radio frequency (RF) transceiver circuitry 108 and an antenna 110. Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to wireless network 104, a telephone number to place a telephone call, commands to be executed on mobile station 102, and possibly other or different user inputs.

Mobile station 102 sends communication signals to and receives communication signals from wireless network 104 over a wireless link via antenna 110. RF transceiver circuitry 108 performs functions similar to those of a base station controller 128 of wireless network 104 (to be described later), including for example modulation/demodulation and possibly encoding/decoding and encryption/decryption. It will be apparent to those skilled in art that RF transceiver circuitry 108 will be adapted to particular wireless network or networks in which mobile station 102 is intended to operate. When mobile station 102 is fully operational, an RF transmitter of RF transceiver circuitry 108 is typically turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 includes a batten interface 122 for receiving one or more rechargeable batteries 124. Battery 124 provides electrical power to electrical circuitry in mobile station 102, and batter) interface 122 provides for a mechanical and electrical connection for battery 124. Battery interface 122 is coupled to a regulator 126 which regulates power to the device. Mobile station 102 also operates using a memory module 120, such as a Subscriber Identity Module (SIM) or a Removable User Identity Module (R-UIM), which is connected to or inserted in mobile station 102 at an interface 118. In the present embodiment, memory module 120 is a SIM. SIM 120 is used to identify an end user (or subscriber) of mobile station 102 and to personalize the device, among other things. Without SIM 120, the mobile station terminal is not fully operational for communication through wireless network 104. By inserting SIM 120 into mobile station 102, an end user can have access to any and all of his/her subscribed services. SIM 120 generally includes a processor and memory for storing information. Since SIM 120 is coupled to SIM interface 118, it is coupled to controller 106 through communication lines 144. In order to identify the subscriber, SIM 120 contains some user parameters such as an International Mobile Subscriber Identity (IMSI). An advantage of using SIM 120 is that end users are not necessarily bound by any single physical mobile station. SIM 120 may store additional user information for the mobile station as well, including datebook (or calendar) information and recent call information. As an alternative to a SIM or an R-UIM, mobile station 102 may operate based on configuration data programmed by a service provider into a non-volatile memory of mobile station 102.

Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Preferably, mobile station 102 is a small portable handheld telephonic unit having a housing (e.g. a small plastic housing) which contains or carries the electrical circuitry and components herein described. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port, on a laptop computer. In this case, the laptop computer would include display 112, keyboard 114, and one or more auxiliary UIs 116. Controller 106 is either embodied as the computer's CPU or a separate CPU within the modem unit. It is also contemplated that a computer or other equipment not normally capable of wireless communication may be adapted to connect to and effectively assume control of RF transceiver circuitry 108 and antenna 110 of a single-unit device such as one of those described above. Note that mobile station 102 may have a more particular implementation as described later in relation to mobile station 202 of FIG. 2. Mobile station 102 communicates in and through wireless network 104 which may be, for example, a cellular telecommunications network. In the embodiment of FIG. 1, wireless network 104 is configured in accordance with General Packet Radio Service (GPRS) and a Global Systems for Mobile (GSM) technologies. Where wireless network 104 is configured in accordance with GSM/GPRS technologies, the network and terminals may further operate in accordance with Enhanced Data rates for GSM Evolution (EDGE) or Enhanced GPRS (EGPRS). However, any suitable type of network architecture and communication protocols may be utilized. For example, wireless network 104 may be configured in accordance with Code Division Multiple Access (CDMA) technologies. As another example, the network may be based on an Integrated Dispatch Enhanced Network (iDEN) which is a high-capacity digital trunked radio system providing integrated voice and data services.

In this GSM/GPRS environment, wireless network 104 includes a base station controller (BSC) 128 with a plurality of associated tower stations (one of which is shown in FIG. 1), a Mobile Switching Center (MSC) 130, a Signaling System 7 (SS7) network 140, a Home Location Register (HER) 138, an IP network 134, a Remote Authentication Dial-In User Service (RADIUS) server 136, a Serving General Packet Radio Service (GPRS) Support Node (SGSN) 131, and a Gateway GPRS Support Node (GGSN) 132. MSC 130 is coupled to BSC 128 and to a landline network 142, such as a Public Switched Telephone Network (PSTN). SGSN 131 is coupled to BSC 128 and to GGSN 132, which is in turn coupled to a public or private data network 144 (such as the Internet). HLR 138 is coupled to MSC 130, SGSN 131, and GGSN 132. SS7 network 140 is communicatively coupled to landline network 142 which may connect mobile station 102 with other call parties such as a call party ISO (e.g. a landline telephone or other mobile station) or an emergency call center 152. On the other hand, IP network 134 is communicatively coupled to the Internet 144. RADIUS server 136 is responsible for performing functions related to authentication, authorization, and accounting (AAA) of packet data services, and may be referred to as an AAA server.

BSC 128 and its tower stations may be referred to as (fixed) transceiver equipment. The transceiver equipment provides wireless network coverage for a particular coverage area commonly referred to as a "cell". The transceiver equipment transmits communication signals to and receives communication signals from mobile stations within its cell via the tower station. The transceiver equipment normally performs such functions as modulation and possibly encoding and/or encryption of signals to be transmitted to the mobile station in accordance with particular, usually predetermined, communication protocols and parameters, under control of its controller. The transceiver equipment similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and mobile station 102. An RF channel is a limited resource that, must be conserved, typically due to limits in overall bandwidth and a limited battery power of mobile station 102. Those skilled in art will appreciate that a wireless network in actual practice may include hundreds of cells, each served by a tower station (i.e. or station sector), depending upon desired overall expanse of network coverage. All pertinent components may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in HLR 138. In case of a voice call to mobile station 102, HLR 138 is queried to determine the current location of mobile station 102. A Visitor Location Register (VLR) of MSC 130 is responsible for a group of location areas and stores the data of those mobile stations that are currently in its area of responsibility. This includes parts of the permanent mobile station data that have been transmitted from HLR 138 to the VLR for faster access. However, the VLR of MSC 130 may also assign and store local data, such as temporary identifications. Optionally, the VLR of MSC 130 can be enhanced for more efficient co-ordination of GPRS and non-GPRS services and functionality (e.g. paging for circuit-switched calls which can be performed more efficiently via SGSN 131, and combined GPRS and non-GPRS location updates).

Serving GPRS Support Node (SGSN) 131 is at the same hierarchical level as MSC 130 and keeps track of the individual locations of mobile stations. SGSN 131 also performs security functions and access control. Gateway GPRS Support Node (GGSN) 132 provides interworking with external packet-switched networks and is connected with SGSNs (such as SGSN 131) via an IP-based GPRS backbone network. SGSN 131 performs authentication and cipher setting procedures based on the same algorithms, keys, and criteria as in existing GSM. In conventional operation, cell selection may be performed autonomously by mobile station 102 or by the transceiver equipment instructing mobile station 102 to select a particular cell. Mobile station 102 informs wireless network 104 when it reselects another cell or group of cells, known as a routing area.

In order to access GPRS services, mobile station 102 first makes its presence known to wireless network 104 by performing what is known as a GPRS "attach". This operation establishes a logical link between mobile station 102 and SGSN 131 and makes mobile station 102 available to receive, for example, pages via SGSN, notifications of incoming GPRS data, or SMS messages over GPRS. In order to send and receive GPRS data, mobile station 102 assists in activating the packet data address that it wants to use. This operation makes mobile station 102 known to GGSN 132; interworking with external data networks can thereafter commence. User data may be transferred transparently between mobile station 102 and the external data networks using, for example, encapsulation and tunneling. Data packets are equipped with GPRS-specific protocol information and transferred between mobile station 102 and GGSN 132.

Wireless network 104 includes position tracking components for tracking the locations of mobile stations. Location information of mobile stations is obtained based on Global Positioning System (GPS) techniques utilizing GPS satellites of a conventional GPS system 154. In the typical configuration, GPS system 154 includes twenty-four (24) GPS satellites that circle the earth every twelve (12) hours. In the present disclosure, mobile station 102 obtains GPS information based on signals received from GPS system 154 and utilizes a location server 190 in wireless network 104 to measure and obtain its location. Location server 190 is connected to MSC 130 and/or IP network 134 and may include what is referred to as a Position Determination Entity (PDE). The PDE is coupled to a GPS receiver 192 for receiving signals and decoding information transmitted by GPS system 154. Note that mobile, station 102 may receive. GPS information from GPS system 154 and location server 190 using the same RF transceiver 108 utilized for typical voice and data communications (or by sharing at least a portion thereof). Thus, a separate GPS receiver need not be utilized in mobile station 102 for receiving GPS information from GPS system 154. Alternatively, a separate GPS receiver may be utilized in mobile station 102 for receiving GPS information from GPS system 154.

Among the currently adopted position location technologies for Enhanced 911 (E911), Assisted GPS (A-GPS) is one of the solutions. Such GPS techniques are described in standard specification documents such as TIA/EIA/IS-801-1. One position location technique will be described. During a voice call involving mobile station 102, real-time GPS location information may be obtained and sent to a receiving entity. To obtain the GPS location information, mobile station 102 operates with GPS system 154 as well as location server 190 in wireless network 104. Conventionally, mobile station 102 obtains GPS acquisition assistance data and uses it to perform what is referred to as a "GPS fix." For the GPS fix, mobile station 102 tunes its GPS receiver to a GPS si anal frequency of GPS system 154. During the GPS fix, mobile station 102 performs GPS pseudorange measurements based on GPS signals received from GPS system 154. Sometime during the voice call mobile station 102 sends the GPS pseudorange data to location server 190, which derives the location of mobile station 102 based on it. Location server/PDE 190 may send this location information to the receiving entity (e.g. a Public Safety Answering Point or PSAP) and/or to mobile station 102. If received by the mobile station, mobile station 102 may send the location information to the receiving entity (e.g. the PSAP).

Figure 2:
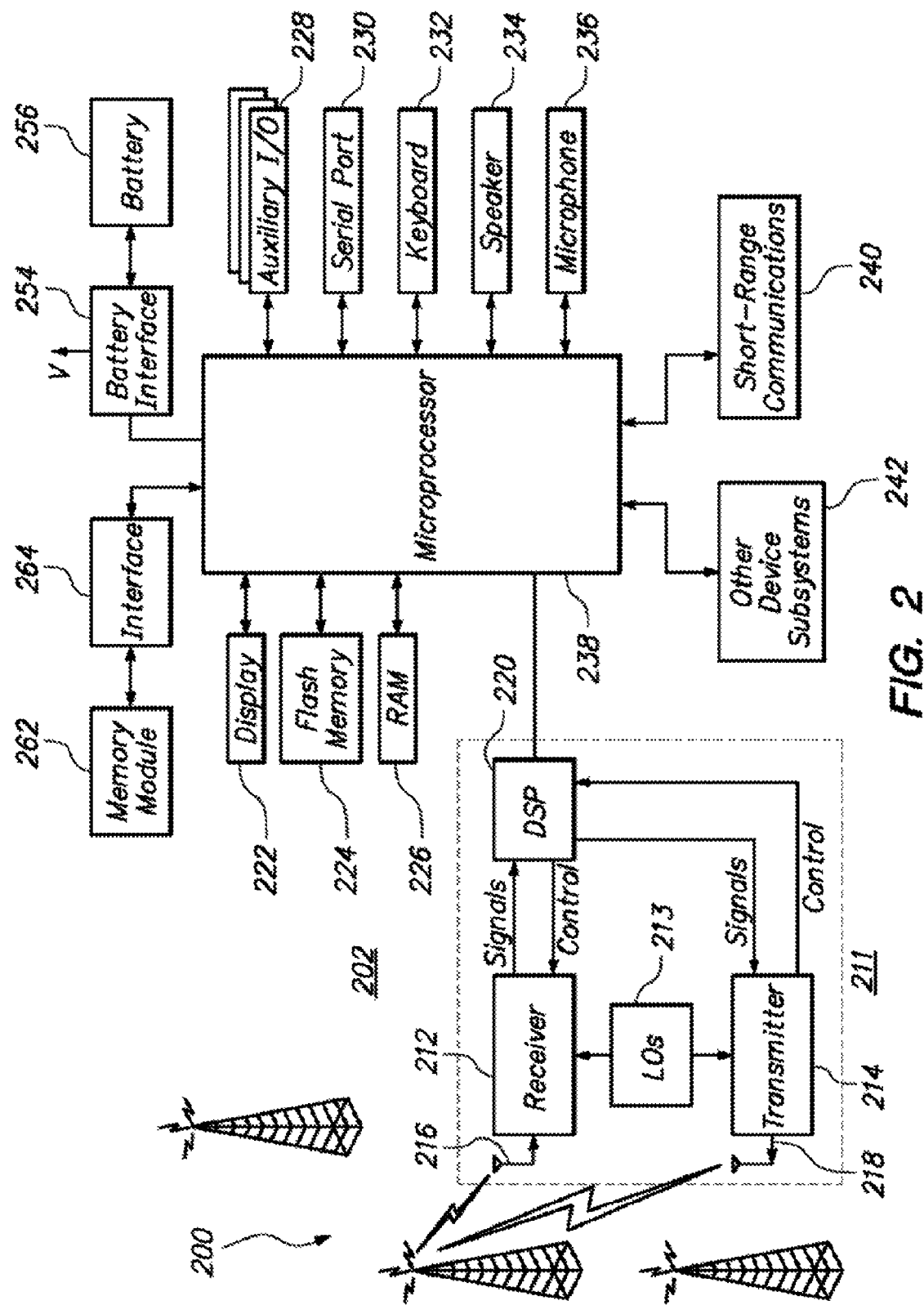
FIG. 2 is a more detailed example of a mobile communication device used in the wireless network of FIG. 1.

FIG. 2 is a detailed block diagram of a preferred mobile communication device or mobile station (MS) 202. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of base station transceiver systems 200 within its geographic coverage area. Mobile station 202 selects or helps select which one of base station transceiver systems 200 it will communicate with, as will be described in more detail later in relation to FIGS. 3 and 4.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a memory module 262, such as a Subscriber Identity Module or "SIM" card or a Removable User Identity Module (R-UIM), to be inserted in or connected to an interface 264 of mobile station 202 in order to operate in the network. Alternatively, a portion of the non-volatile memory or flash memory 224 is programmed with configuration data by a service provider so that mobile station 202 may operate in the network. Since mobile station 202 is a portable handheld battery-powered device, it also includes a battery interface 254 for receiving one or more rechargeable batteries 256. Such a battery 256 provides electrical power to most if not all electrical circuitry in mobile station 202, and battery interface 254 provides for a mechanical and electrical connection for it. Battery interface 254 is coupled to a regulator (not shown in FIG. 2) which provides power to all of the circuitry.

Mobile station 202 includes a microprocessor 238 (which is one implementation of controller 106 of FIG. 1) which controls overall operation of mobile station 202. This control includes the call or communication features of the present disclosure. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text, message for transmission over a communication network, and device-resident functions such as a calculator or task list. Operating system software used by microprocessor 238 is preferably stored in a persistent store such as flash memory 224, which may alternatively be a read-only memory (ROM) or similar storage element, (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications (such as a network re-establishment scheme), will normally be installed on mobile station 202 during its manufacture. A preferred application that may be loaded onto mobile station 202 may be a personal information manager (MM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host, computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that, the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG.

Referring back to FIG. 1, mobile station 102 may be operative to provide GPS location information to a requesting entity (e.g. terminating call party 150 or emergency center 152) for the identification of the location of mobile station 102. To do this, one of a few different techniques may be utilized in wireless network 104. For one, mobile station 102 causes GPS navigational-type data to be regularly or periodically requested, received, and stored in memory during its idle mode of operation or during a voice call. GPS navigational-type data may be "raw" navigational data or, alternatively, data derived from the raw navigational data which may include GPS ephemeris parameter data and/or GPS almanac parameter data ("hence the term, "navigational-type" data). The GPS navigational-type data may be received from location server 190 through the wireless network or, alternatively, directly from GPS system 154, or both. Note that location server/PDE 190 utilizes a triangulation/trilateration procedure to obtain the coarse location of mobile station 102 in order to derive the GPS acquisition assistance information for mobile station 102. Alternatively, the longitude and latitude of the serving base station(s) that may be available from broadcasted messages from the base station(s) may be used as the coarse location for location server/PDE 190 to derive the GPS acquisition assistance information for mobile station 102.

Subsequently, mobile station 102 performs a GPS procedure for obtaining GPS location information. In particular, mobile station 102 derives GPS acquisition assistance data and/or sensitivity assistance data based on the last previous GPS navigational-type data received and stored in memory. GPS acquisition assistance data may include data that identifies the appropriate surrounding GPS satellites, Doppler frequencies, and time delay window information. Sensitivity assistance data includes predicted bit contents of the GPS navigational data that will be modulated onto the GPS signals at the time the GPS fix is going to be performed. Next, mobile station 102 causes a GPS fix to be performed with GPS system 154. During the GPS fix, the GPS/wireless receiver of mobile station 102 is tuned to a GPS frequency to receive GPS signals from GPS system 154. Mobile station 102 obtains GPS measurement data associated with mobile station 102 based on the GPS signals received from GPS system 154. The GPS measurement data may be or include GPS pseudorange data.

During a voice call, a traffic channel is maintained between mobile station 102 and wireless network 104 so that voice communications may take place between the end user of mobile station 102 and terminating call party 150, for example. Terminating call party 150 is associated with a telephone number which may have been selected by the end user of mobile station 102. Terminating call party 150 may be any ordinary call party (e.g. family, friend, or colleague of the end user) or, alternatively, an emergency call center associated with "911" or other emergency telephone number such as a Public Safety Answering Point (or PSAP). Sometime during the voice call, mobile station 102 causes measurements from base station signals of wireless network 104 to be made. These measurements are obtained not for purpose of providing the coarse location of mobile station 102, but rather for use in combination with pseudoranges to enhance location accuracy when the available GPS pseudoranges alone are not sufficient for determining the location accurately.

Next, mobile station 102 causes the measurement data and a request for location determination to be sent to location server or PDE 190. The sending of the GPS measurement data may be performed in response to a request from location server 190 or other requesting entity, or autonomously by the mobile station 102 (e.g. triggered by the dialed phone number such as an emergency number like "911"). Next, location server/PDE 190 computes the location of mobile station 102 based on a triangulation/trilateration technique using the data. The location information of mobile station 102 may be or include latitude, longitude, and altitude information. Location server 190 may send the resulting location information of mobile station 102 directly to terminating call party 150 with or without its request. Alternatively, location server 190 may send the location information to mobile station 102, which may send in turn to terminating call party 190. In an alternative approach, location server/PDE 190 need not be utilized as described above in the case where mobile station 102 is adapted to compute the location information by itself in an MS-only approach.

Figure 3:
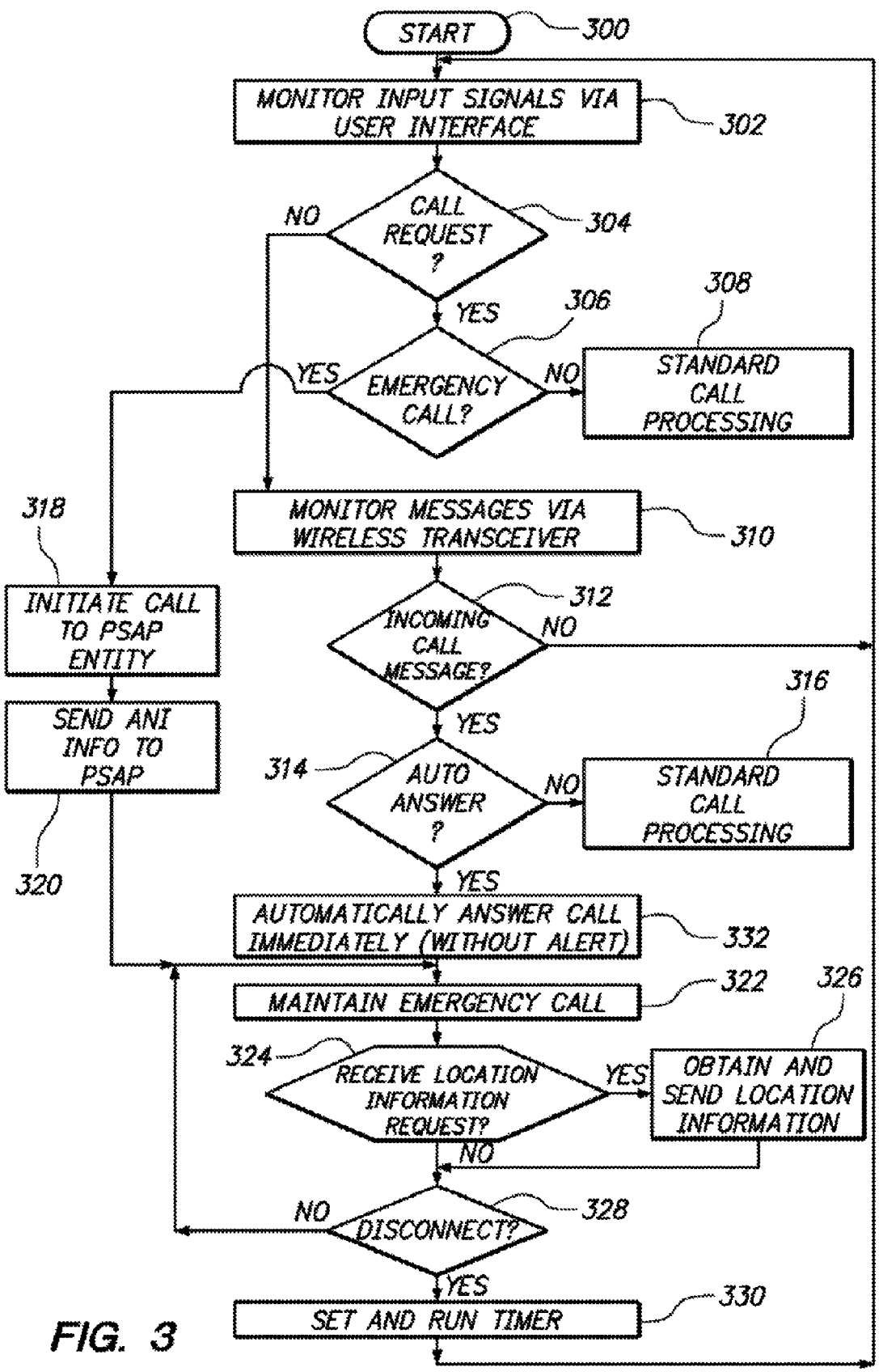
FIG. 3 is a flowchart of a method for use by a mobile communication device, such as the mobile communication device described in relation to FIGS. 1-2, for processing emergency calls and other communications.

FIG. 3 is a flowchart of an illustrative method for use by a mobile communication device in processing emergency communications. The method may be performed by the mobile device in connection with pertinent system components as described, using one or more processors, memory, user interface and its wireless transceiver (e.g. see FIGS. 1-2). The method may further be embodied in a computer program product which includes a computer readable medium (e.g. memory or computer disk) having computer instructions stored therein which are executable by one or more processors (e.g. a microprocessor) of the mobile device.

In general, as will be described, the method of FIG. 3 involves an emergency call with a public safety answering point (PSAP) entity which is established by the mobile device via the wireless network. If the emergency call is disconnected, the mobile device monitors to receive an incoming call message for a continued emergency call from the public safety answering point entity. In response to receiving such incoming call message, the mobile device refrains from producing an audible alert and automatically answers the continued emergency call from the public safety answering point entity without detecting any manual answer signal via its user interface. Appropriate information which was unavailable from the initial emergency call may therefore be obtained in the continued emergency call. This information may include, for example. GPS-based location information which identifies the geographic position the mobile device. In one specific approach, the mobile device answers the call automatically if the incoming call message is received within a time period following the disconnection and a data indication of the incoming call message indicates that the message is for the continued emergency call or automatic answering. Otherwise, if the incoming call message is received outside of the time period following the disconnection, or if the data indication fails to indicate that the incoming call message is for the continued emergency call or the automatic answering, the mobile device refrains from automatically answering the call associated with the incoming call message.

Beginning at a start block 300 of FIG. 3, the mobile device monitors its user interface for user input signals (step 302 of FIG. 3), as the end user of the mobile device may be attempting to place a voice call via the wireless communication network. If the processor detects a call request for the voice call via the user interface, (step 304 of FIG. 3), then the processor identifies whether the call request is for an emergency call (step 306 of FIG. 3). To identify whether the call request is for an emergency call, the processor may identify a predetermined code (e.g. 911 or the like) entered or selected by the end user for the call, a predetermined user input selection corresponding to a emergency call (e.g. user selection of "PLACE EMERGENCY CALL" button or icon provided by the mobile device), or a sensor output signal associated with the mobile device (e.g. a "man down" signal from the mobile device). If the call request is for a non-emergency call in step 306, then the processor performs normal or conventional call setup procedures and processing for the non-emergency call (step 308 of FIG. 3).

If the call request is for an emergency call as identified in step 306, then the processor causes an emergency call to be initiated via the wireless transceiver to the PSAP entity (step 318 of FIG. 3). At the time of the call setup, an automatic number identification (ANI) or caller identification (caller ID) associated with the mobile device is communicated to the PSAP entity (step 320 of FIG. 3). The ANI information may be or include a number corresponding to the mobile identifier which uniquely identifies the mobile device. The PSAP entity receives the ANI information and answers the incoming call, so that the emergency call is established and maintained between the mobile device and the PSAP entity via the wireless network (step 322 of FIG. 3). During the call, the mobile device monitors to receive any location information request (e.g. GPS position) from the PSAP entity (step 324 of FIG. 3). If a location information request is received as identified in step 324, then the processor causes location information corresponding to a geographic location of the mobile device to be sent for use by the PSAP entity (step 326 of FIG. 3). This may be performed at, least in part using techniques described above in relation to FIG. 1. Alternatively, the sending of the information may be performed autonomously by the mobile station 102 (i.e. step 326 is performed after step 322 without-receiving any request in step 324). The PSAP entity may therefore obtain the geographic location of the mobile device.

If conditions are adequate, all necessary information is properly communicated during the emergency call between the mobile device and the PSAP entity, so that the emergency situation may be properly handled. Examples of appropriate information include the telephone number of the mobile device (ANI or Caller ID), the geographic location of the mobile device (GPS-based geographic location), the address of the location of the mobile device, the name of the end user of the mobile device and other involved parties, information useful to the end user to handle the emergency situation, etc. However, the emergency call may become prematurely disconnected (step 328 of FIG. 3) such that all pertinent information was not properly communicated. The emergency call may become disconnected in a number of different ways. For example, the mobile device may be in-coverage with the wireless network during the emergency call, but then may be subsequently repositioned or relocated so as to be out-of-coverage with the wireless network to cause the call to be disconnected. As another example, the emergency call may be inadvertently or intentionally terminated by the end user or a third party.

As described herein, utilizing techniques of the present disclosure, the PSAP entity is able to call back the mobile device in a continued emergency call. This continued emergency call from the PSAP entity may be a silent and/or automatically-answered voice call.

If the processor detects the disconnection of the emergency call at step 328 of FIG. 3, the processor may set and run a timer (step 330 of FIG. 3). The timer set in step 330 may be utilized by the mobile device to define a time period from the disconnection within which the PSAP entity may call back the mobile device. The time period may be, for example, anywhere between 2-10 minutes; however, other time periods may be suitable.

The processor will then go back to monitor for user input signals at the user interface (step 302) and for incoming messages via the wireless transceiver (step 310). In a preferred technique, with respect to step 302 the processor inhibits any calls attempted from the mobile device via the wireless network by the end user (except perhaps for any follow-up emergency call by the end user) for the time period defined by the timer. After expiration of the timer, the process will allow calls attempted from the mobile device by the end user.

While monitoring for messages via the wireless transceiver in step 310 after the disconnection, an incoming call message directed to the mobile device for a voice call may be received (step 312 of FIG. 3). The incoming call message may be for the continued emergency call from the PSAP entity after the disconnection. The PSAP entity utilizes the ANI or Caller ID Information associated with the mobile device to place this continued emergency call. If no incoming call message is received in step 312, the processor continues monitoring for the user input signals and radio messages in step 302 and 310.

If an incoming call message directed to the mobile device is received in step 312, however, then the processor identifies whether the incoming call message is for a call that requires a silent and/or automatic-answering by the mobile device (step 314 of FIG. 3). In a first embodiment associated with step 314, if the incoming call message for a call from the PSAP entity is received within the time period defined by the timer set in step 330, then the processor causes the incoming call to be automatically answered without detecting any manual answer signal via the user interface of the mobile device (step 332 of FIG. 3). Also, the processor refrains from producing any audible alert for alerting of the call. If, however, the incoming call message is received outside of the time period defined by the timer, then the processor causes normal or standard call procedures to be performed for the incoming call (step 316 of FIG. 3). For standard call procedures, the processor typically causes the audible alert to be produced at the mobile device to alert the end user of the incoming call and requires that the processor detect a manual answer signal via the user interface (e.g. detection of an actuation of a key or button, or rotation or sliding of the mobile device's housing) to cause the call to be answered.

In a second embodiment associated with step 314, if the incoming call message includes a data indication that indicates that the call is the continued emergency call (i.e. for silent and/or automatic-answering), then the processor causes the incoming call to be automatically answered without detecting any manual answer signal via the user interface of the mobile device in step 332. Also, the processor refrains from producing any audible alert for alerting of the call. See the later discussion in relation to FIG. 5 below. If, however, the data indication fails to indicate that the call is for the continued emergency call or for silent automatic-answering, then the processor causes normal or standard call procedures to be performed for the incoming call in step 316. Again, in standard call procedures, the processor typically causes the audible alert to be produced at the mobile device to alert the end user of the incoming call and requires that the processor detect the manual answer signal via the user interface in order to answer the call.

In a third embodiment associated with step 314, if the incoming call message for a call from the PSAP entity is received within the time period defined by the timer set in step 330, and the incoming call message includes a data indication that indicates that the call is the continued emergency call (i.e. for silent and/or automatic-answering), then the processor causes the incoming call to be automatically answered without detecting any manual answer signal via the user interface of the mobile device in step 332. Also, the processor refrains from producing any audible alert for alerting of the call. If, however, the incoming call message is received outside of the time period defined by the timer, or the data indication fails to indicate that the call is for the continued emergency call or for silent automatic-answering, then the processor causes normal or standard call procedures to be performed for the incoming call in step 316. Thus, in this third embodiment, the means to initiate automatic/silent answering is dependent on both the time period and the data indication variables.

In yet a fourth embodiment associated with step 314, if the incoming call message for a call from the PSAP entity is received within the time period defined by the timer set in step 330, or the incoming call message includes a data indication that indicates that the call is the continued emergency call (i.e. for silent and/or automatic-answering), then the processor causes the incoming call to the automatically answered without detecting any manual answer signal via the user interface of the mobile device in step 332. Also, the processor refrains from producing any audible alert for alerting of the call. If, however, the incoming call message is received outside of the time period defined by the timer, and the data indication fails to indicate that the call is for the continued emergency call or for silent, automatic-answering, then the processor causes normal or standard call procedures to be performed for the incoming call in step 316. Thus, in this fourth embodiment, the time period and data indication variables are independent and advantageously provide separate means to initiate automatic/silent answering. After step 332, where the continued emergency call is automatically answered by the mobile device, the mobile device will maintain the continued emergency call as indicated in step 322. The steps may repeat as necessary as provided in the flowchart. The continued emergency call ensures that all necessary information may be properly communicated during the emergency call between the mobile device and the PSAP entity, so that the emergency situation may be properly handled.

In one particular embodiment, the disconnection of the emergency call in step 328 is caused by the mobile device experiencing an out-of-coverage condition with the wireless network. After an out-of-coverage condition with the wireless network which caused the emergency call to be disconnected, the processor may identify that an in-coverage condition with the wireless network has been gained. In response, the processor causes a message to be transmitted to the wireless network. The wireless network receives this message to identify that the mobile device is available again, and this message or a corresponding message may be communicated to the PSAP entity to indicate the same. Thereafter, in response to this message, the PSAP entity causes the continued emergency call to be placed to the mobile device.

Figure 5:
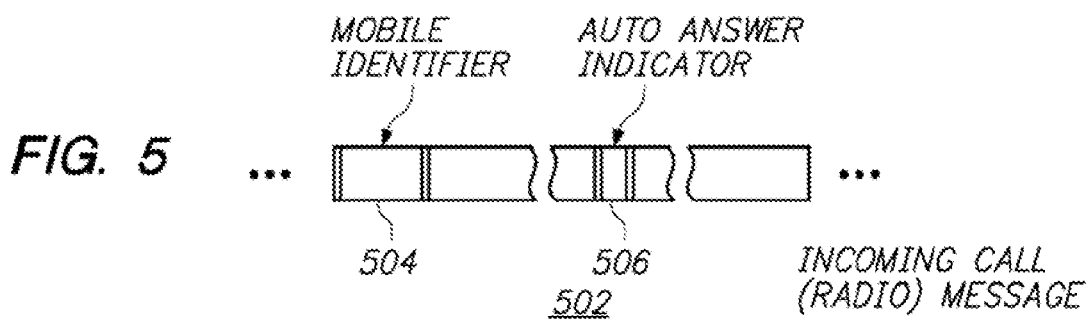
FIG. 5 is an illustrative depiction of an incoming call message which may have a data indication in one or more data fields to indicate whether the incoming call message is for a continued emergency call or automatic answering by the mobile communication device.

FIG. 5 is an illustrative depiction of an incoming call message 502 which may have a data indication 506 in one or more data fields to indicate whether incoming call message 502 is for a continued emergency call (i.e. for silent/automatic answering) the mobile device. In this embodiment, incoming call message 502 is a radio or air interface message which is broadcasted over the wireless network over a control or paging channel. Depending on the environment or context, incoming call message 502 may be or be referred to as a page message, a call control message, or a call setup message. If data indication 506 is a bit indication, for example, a bit '1' may indicate that the incoming call is a continued emergency call (i.e. for silent and/or automatic answered call), whereas a bit '0' may indicate that the incoming call is not a continued emergency call (i.e. not for a silent and/or automatic answered call). Incoming call message 506 includes other pertinent information as well, such as a mobile identifier 504 which uniquely identifies the mobile device to which the incoming call is directed. While monitoring for broadcasted messages, the processor of the mobile device operates to compare mobile identifier 504 with its own stored mobile identifier and, if there is a match, the processor performs the acts as described in relation to step 314 of FIG. 3.

Note that the same data indication 506 for automatic answering may also instruct the mobile device to silently answer the incoming call without producing the audible alert to alert the end user of the call. In an alternate embodiment, data indication 506 is utilized to indicate that the incoming call is to be automatically answered by the mobile device, but a separate data indication in the incoming call message different from data indication 506 is utilized to indicate whether the incoming call is to be silently answered or not.

Figure 9:
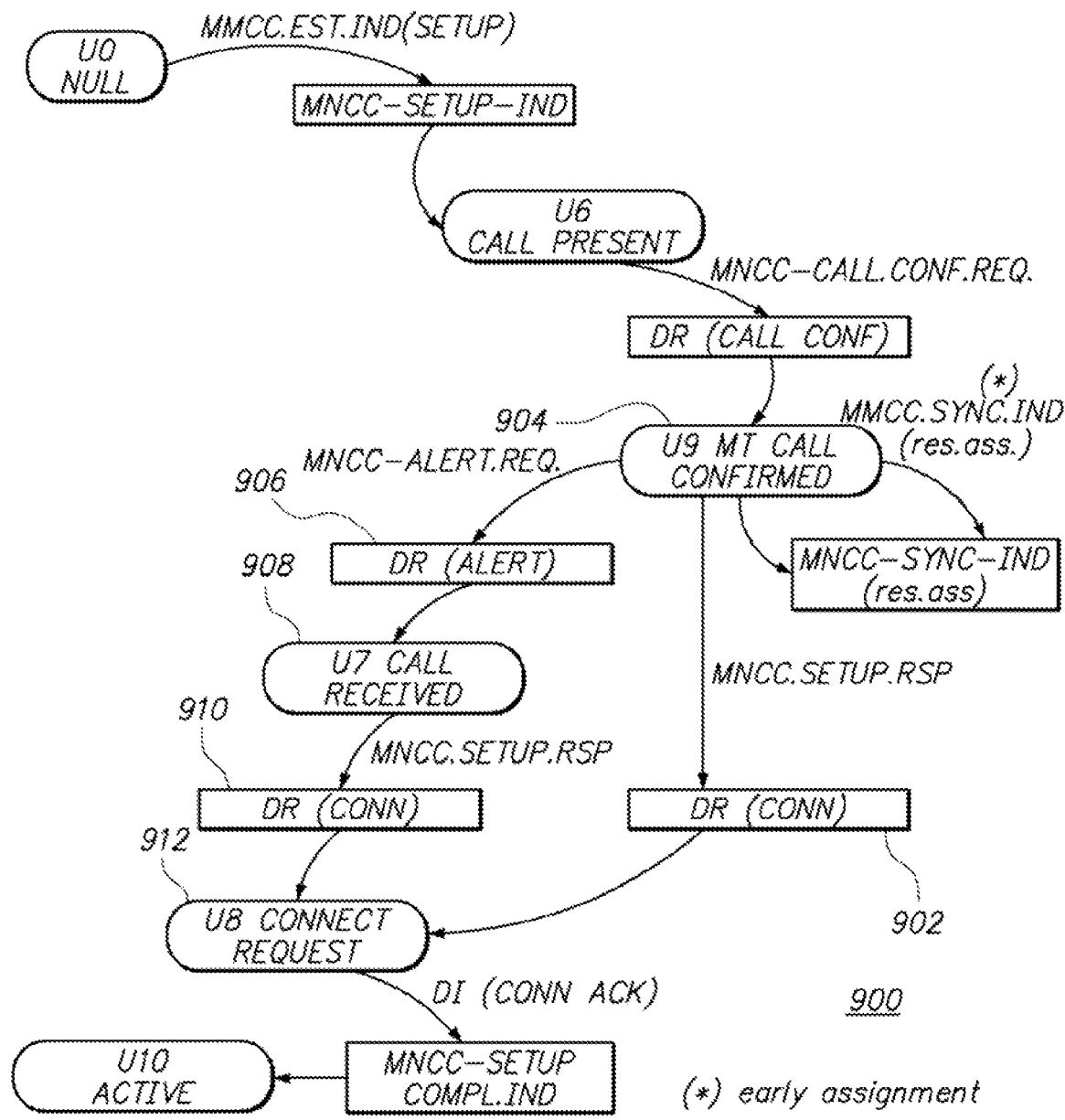
FIG. 9 is a call flow diagram to illustrate an immediate connect feature which may be utilized in the emergency call processing of the present disclosure for GSM/GPRS networks.

Referring ahead to FIG. 9, a relevant portion of a call flow diagram 900 for illustrating an immediate connect feature which may be utilized in the call processing of the present disclosure for GSM/GPRS networks is shown. Call flow diagram 900 is based on the GSM Call Control layer processing for mobile devices as described in GSM specification documents. Note that MNCC is an acronym for Mobile Network Call Control, and MMCC is an acronym for Mobility Management Call Control. Such processing may take place with respect to steps 312, 314, 316, and 320 of FIG. 3. Beginning at a process 904 (U9 MT CALL CONFIRMED) where a normal, non-emergency call is received by the mobile device, the mobile device proceeds to a process 906 (DR (ALERT)) after a MNCC_ALERT_REQ, followed by a process 908 (U7 CALL RECEIVED), followed by a process 910 (DR (CONN)) after a MNCC_SETUP_RESP, and followed by a process 912 (U8 CONNECT REQUEST). For a continued emergency call (or silent/automatic call), however, process flow from process 904 (MT CALL CONFIRMED) proceeds directly to a process 902 (DR(CONN)) after a MNCC_SETUP_RESP and is followed by process 912 (U8 CONNECT REQUEST). As apparent, the mobile device refrains from performing processes 906, 908, and 910 for the continued emergency call (i.e. silent/automatic call) but rather performs the MNCC_SETUP_RESP and process 902. This ends the discussion in relation to FIG. 9.

Figure 6:
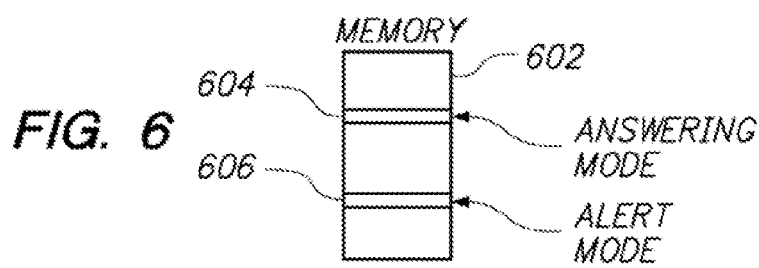
FIG. 6 is an illustrative depiction of a memory of the mobile communication device which may have programmable data indications stored therein for setting either an audible alert answer mode or a silent answer mode for incoming calls to the mobile communication device, and/or for setting either a manual answering mode or an automatic answering mode for incoming calls to the mobile communication device.

Preferably, automatic and/or silent answering for calls for the mobile device is performed despite other programmable data. Indications which may be provided for and utilized by the mobile device. To illustrate, FIG. 6 is an illustrative depiction of a memory 602 of the mobile device which may have programmable data indications 604 and 606 stored therein. Programmable data indication 604 is for setting either an audible alert answer mode or a silent answer mode for incoming calls to the mobile device, whereas programmable data indication 606 is for setting either a manual answering mode or an automatic answering mode for incoming calls to the mobile device. Programmable data indications 604 and 606 are programmable in that the end user may change these modes when desired. The processor may control and/or select the modes of the mobile device based on user input signals received via a user input device of the user interface. The user input device may be or include, for example, one or more buttons or keys of the mobile device. In response to actuations or the buttons or keys by the end user, the processor may provide for a selection or toggling between the modes, for example. Preferably, the processor causes a graphical user interface (GUI) to be provided or rendered in the visual display, which includes a GUI buttons or a menu list for the end-user's selecting between the different modes.

Again, programmable data indication 606 of FIG. 6 is for setting either the audible alert answer mode or the silent answer mode for incoming calls of the mobile device. If the programmable data indication is a bit indication, for example, a bit '0' may indicate that the audible alert answer mode for incoming calls is to be utilized and a bit '1' may indicate that the silent answer mode for incoming calls is to be utilized. Note that the opposite bit definitions or other bit configurations may be utilized as alternatives. Put another way, the bit '0' may indicate that the device settings for incoming calls are to be utilized and the bit '1' may indicate that the remote silent answer control for the incoming call is to be utilized. Typically, when the processor receives an incoming call message for a normal incoming voice call to the mobile device and the audible alert answer mode is enabled, the processor causes an audible alert to be produced via the user interface to alert the end user of the incoming call. On the other hand, when the processor receives an incoming call message for a normal incoming voice call to the mobile device and the silent answer mode is enabled, the processor refrains from causing any audible alert to be produced via the user interface to alert the end user of the incoming call. However, when the programmable data indication 606 is set to enable the audible alert answer mode, but the incoming call message for the incoming voice call has the data indication for silent, (automatic) answering (e.g. see FIG. 5), the processor still refrains from causing any audible alert to be produced via the user interface to alert the end user of the incoming call. See Table 1 below for one example truth table logic for such functionality.

TABLE 1

Truth Table Logic For Alert Mode Of Mobile Device.

| Programmable Data Indication Set By End User | Data Indication From Radio Message | Resulting Mode |
|---|---|---|
| Audible Alert | No Remote Silent Answer Control | Audible Alert |
| Audible Alert | Enable Remote Silent Answer | Silent Answer |
| Silent Alert | No Remote Silent Answer Control | Silent Answer |
| Silent Alert | Enable Remote Silent Answer | Silent Answer |

On the other hand, programmable data indication 604 of FIG. 6 is for setting either the manual answering mode or the automatic answering mode of the mobile device. If the programmable data indication is a bit indication, for example, a bit '0' may indicate that the manual answering mode for incoming calls is to be utilized and a bit '1' may indicate that the automatic answering mode for incoming calls is to be utilized. Note that the opposite bit definitions or other hit configurations may be utilized as alternatives. Put another way, the bit '0' may indicate that the device settings for incoming calls are to be utilized and the bit '1' may indicate that the remote automatic answer control for the incoming call is to be utilized. Typically, when the processor receives an incoming call message for a normal incoming voice call to the mobile device and the manual answering mode is enabled, the processor causes the incoming voice call to be answered only upon detecting a manual answer signal by the end user via the user interface. On the other hand, when the processor receives an incoming call message for a normal incoming voice call to the mobile device and the automatic answering mode is enabled, the processor causes the incoming voice call to be automatically answered without detecting any manual answer signal by the end user via the user interface. However, when the programmable data indication 604 is set to enable the manual answer mode, but the incoming call message for the incoming voice call has the data indication for automatic (silent) answering (e.g. see FIG. 5), the processor still causes the incoming voice call to be automatically answered without detecting any manual answer signal by the end user via the user interface. See Table 2 below for one example truth table logic for such functionality.

TABLE 2

Truth Table Logic For Answer Mode Of Mobile Device.

| Programmable Data Indication Set By End User | Data Indication From Radio Message | Resulting Mode |
|---|---|---|
| Manual Answer | No Remote Automatic Answer Control | Manual Answer |
| Manual Answer | Enable Remote Automatic Answer | Automatic Answer |
| Automatic Answer | No Remote Automatic Answer Control | Automatic Answer |
| Automatic Answer | Enable Remote Automatic Answer | Automatic Answer |

In another scenario, programmable data indication 606 of FIG. 6 again is for setting either the audible alert answer mode or the silent answer mode for incoming calls of the mobile device. However, when the programmable data indication 606 is set to enable the audible alert answer mode, but the incoming call message for the incoming voice call has the data indication for both silent and automatic answering (e.g. see FIG. 5), the processor refrains from causing any audible alert to be produced via the user interface to alert the end user of the incoming call and causes the call to be automatically answered (i.e. the device settings are overridden). Whenever the incoming call message for the incoming voice call has the data indication set for no automatic/silent answering, however, the device settings are utilized and not overridden by the data indication in the radio message. See Table 3 below for one example truth table logic for such functionality.

TABLE 3

Truth Table Logic For Answer Mode Of Mobile Device.

| Programmable Data Indication Set By End User | Data Indication From Radio Message | Resulting Mode |
|---|---|---|
| Audible Alert | No Remote Automatic/Silent Answer Control | Manual Answer With Audible Alert as set by end user |
| Audible Alert | Enable Remote Automatic/Silent Answer | Automatic/Silent Answer |

TABLE 3-continued

Truth Table Logic For Answer Mode Of Mobile Device.

| Programmable Data Indication Set By End User | Data Indication From Radio Message | Resulting Mode |
|---|---|---|
| Silent Alert | No Remote Automatic/Silent Answer Control | Manual Answer With Silent Alert as set by end user |
| Silent Alert | Enable Remote Automatic/Silent Answer | Automatic/Silent Answer |

Figure 4:
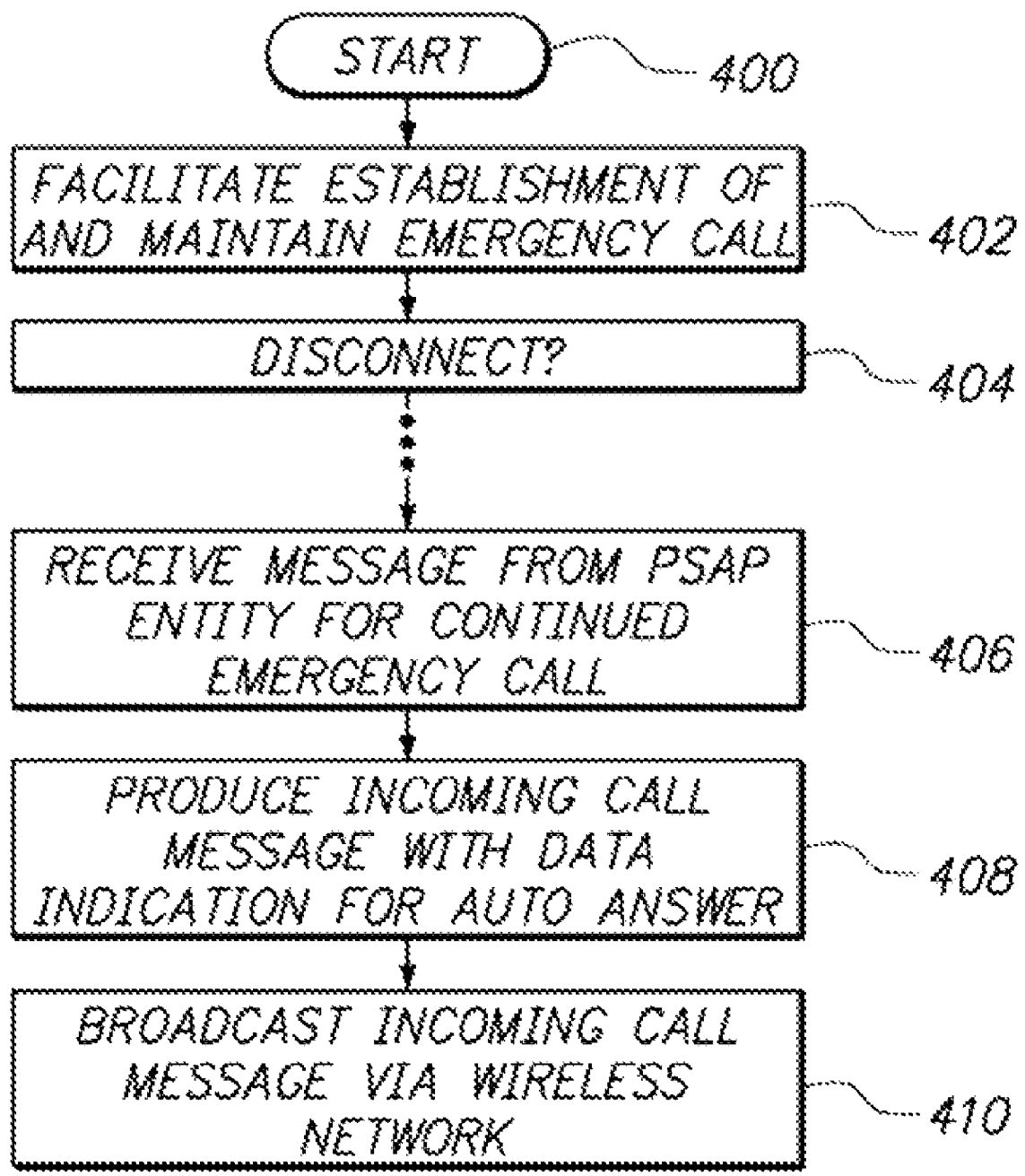
FIG. 4 is a flowchart of a method for use in a wireless communication network, such as the wireless communication network of FIG. 1, in processing emergency communications for a mobile communication device, such as the mobile communication device described in relation to FIGS. 1-2.

Reference will now be made to FIG. 4, which shows a flowchart of a general method for use in a wireless communication network for processing emergency communications for mobile communication devices, which may compliment the method described in relation to FIG. 3. The method may be performed in the wireless communication network in connection with pertinent system components as described, using one or more network processors, memory, and transceivers (e.g. see FIG. 1). At least portions of the method may further be embodied in a computer program product which includes a computer readable medium (e.g. memory or computer disk) having computer instructions stored therein which are executable by one or more processors (e.g. a microprocessor).

Beginning at a start block 400 of FIG. 4, the wireless network is adapted to facilitate the establishment of an emergency call between a mobile communication device operating in the wireless network and a public safety answering point (PSAP) entity (step 402 of FIG. 4). During the emergency call, the wireless network may identify a call termination message or a failure condition (e.g. an out-of-coverage condition) which causes the emergency call to be disconnected (step 404 of FIG. 4). Sometime after the disconnection, the wireless network receives a message for a continued emergency call with the mobile device which was initiated by the PSAP entity (step 406 of FIG. 4). The PSAP entity initiates the continued emergency call to the mobile device using the ANI or Caller ID information previously received in the initial emergency call. In response to receiving the message, the wireless network produces an incoming call message directed to the mobile device for transmission via the wireless network. When producing the incoming call message, the wireless network sets a data indication in one or more data fields of the incoming call message (step 408 of FIG. 4). The data indication is for use in instructing the mobile device to automatically answer the call without detection of a manual answer signal via its user interface. The data indication (or a different indication) may also be for use in instructing the mobile device to refrain from producing an audible alert for alerting of the continued emergency call. Thereafter, the wireless network causes this incoming call message for the continued emergency call to be broadcasted via the wireless network for receipt by the mobile device (step 410 of FIG. 4). The mobile device answers the continued emergency call in an automatic and/or silent manner.

Regarding other related techniques of the present disclosure, note that emergency calls described herein may be disconnected in response to an intentional or inadvertent action at the mobile device, whether by the end user or a third party. When this occurs, it may be impossible or difficult for communications between the PSAP entity and the mobile device to take place in any continued emergency call unless special techniques are utilized. For example, the mobile device may have been dropped, taken from, or otherwise out-of-reach of the end user. As another example, the configuration of the mobile device may not easily allow for such continued communication.

Figure 8A:
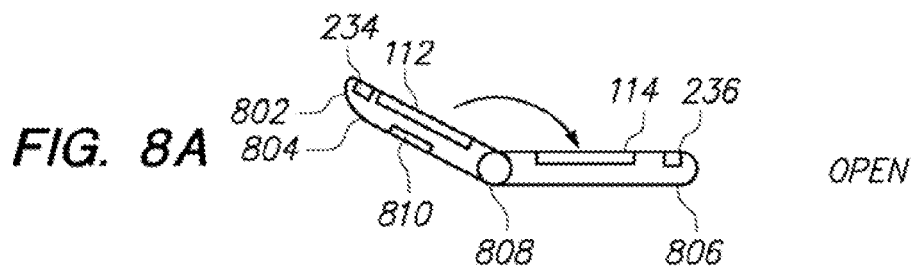
FIGS. 8a and 8b are side views of one type of mobile communication device having an open position (FIG. 8a) and a closed position (FIG. 8b) which may be utilized in techniques of the present disclosure.
Figure 8B:

To illustrate this latter problem further, FIGS. 8a and 8b show side views of one configuration of a mobile device having a housing 802 which provides an open position (FIG. 8a) and a closed position (FIG. 8b). In the embodiment of FIGS. 8a-8b, housing 802 has a first (top) housing portion 804 and a second (bottom) housing portion 806 which are connected by a hinge assembly 808 to provide the open and closed positions. Hinge assembly 808 may alternatively be a slide assembly or pivot point assembly, for example, for providing the open and the closed positions. In the embodiment of FIGS. 8a and 8b, first housing portion 804 carries display 112 and speaker 234, and second housing portion 806 carries keyboard 114 and microphone 236. The open position in FIG. 8a exposes display 112, keyboard 114, speaker 234, and microphone 236 for use, whereas the closed position in FIG. 8b covers and/or renders inactive display 112, keyboard 114, speaker 234, and microphone 236. As apparent in FIG. 8b, if the mobile device is in the closed position after the disconnection of the emergency call, continued communications may be impossible or difficult for communications to take place in any-continued emergency call unless special techniques are utilized.

To solve this problem, one type of mobile device which may be utilized in the techniques may be configured to selectively provide a handset talk mode and a speakerphone talk, mode for voice calls. A speakerphone transducer (e.g. a speakerphone transducer 810 of FIGS. 8a and 8b) is provided in addition to the conventional handset speaker and microphone. As exemplified in FIGS. 8a and 8b, this speakerphone transducer 810 may be provided on an outside or opposite side of the housing which otherwise provides the handset speaker 234 and microphone 236.

Figure 7:
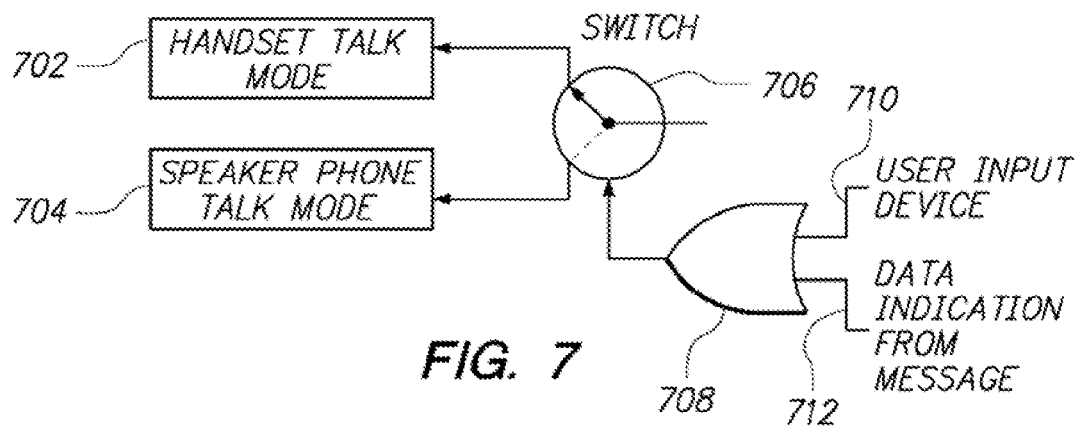
FIG. 7 is a functional block diagram of the mobile communication device which illustrates the functionality associated with a handset talk mode and a speakerphone talk mode of the mobile communication device, which may be controlled based on the data indication in the one or more data fields of the incoming call message.

To further illustrate, FIG. 7 is a block diagram which illustrates the functionality associated with a talk mode for voice calls of the mobile device. The talk mode of the mobile device includes a handset talk mode 702 and a speakerphone or "hands-free" talk mode 704. Switching circuitry 706 may be coupled to and controlled by the processor of the mobile device to switch between handset talk mode 702 and speakerphone talk mode 704.

For handset talk, mode 702, the processor enables a handset speaker and microphone (including its associated circuitry) of the mobile device via switching circuitry 706 for the end user to listen and talk, respectively, during a voice call. When enabled, the handset speaker/microphone and associated circuitry provide a limited private geographic range for the conveyance of audio signals of the voice call. To communicate effective in the handset talk mode 702 during the voice call, the end user holds the mobile device (e.g. the portable handheld telephonic device) and positions it alongside the end user's head, such that the handset speaker is adjacent the end user's ear and the handset microphone is near the end user's mouth. Otherwise, the audio signals will fail to have sufficient strength to be communicated to the end user and the other party of the call.

For speakerphone talk mode 704, the processor enables an alternative transducer (speaker/microphone) (including its associated circuitry) of the mobile device via switching circuitry 706 for the end user to listen and talk during a voice call. Note that speakerphone talk mode 704 may be or may be alternatively referred to as a "hands-free" talk mode. When enabled, the speakerphone transducer and associated circuitry provide a wider broadcasted geographic range for the conveyance of audio signals of the voice call. To communicate in speakerphone talk mode 704 during the voice call the end user positions the mobile device a suitable distance away (e.g. within or between 0.5-1.5 meters) either kept in the end user's hand or on a suitable surface. In speakerphone talk mode 704, the audio signals of the voice call have sufficient strength to be adequately conveyed to the end user and the other party of the call despite the distance between the mobile device and the end user.

The processor may control and/or select the talk mode of the mobile device based on an input 710 from a user input device of the user interface. The user input device may be or include, for example, one or more buttons or keys of the mobile device. In response to actuations or the buttons or keys by the end user, the processor may provide for a selection or toggling between handset talk mode 702 and speakerphone talk mode 704 during the voice call. Thus, the processor may detect a manual speakerphone activation signal via the user interface from the end user for activating the speakerphone talk mode 704. Preferably, the processor causes a graphical user interface (GUI) to be provided or rendered in the visual display, which includes a GUI buttons or a menu list for the end-user's selecting between handset talk mode 702 and speakerphone talk mode 704.

The processor may additionally or alternatively control the talk mode of the mobile device based on an input 712 which corresponds to a data indication in the one or more data fields of the incoming call message from the PSAP entity (see e.g. FIG. 5). If the data, indication is a bit indication, for example, a bit '0' may indicate that the handset talk mode 702 is to be utilized and a bit '1' may indicate that speakerphone talk mode 704 is to be utilized. Note that the opposite bit definitions or other bit configurations may be utilized as alternatives. Put another way, the bit '0' may indicate that the device settings are to be utilized for selection of modes 702 or 704, and the bit '1' may indicate that speakerphone talk mode 704 for remote speakerphone enabling is to be utilized (i.e. overriding the device settings). In addition or alternative to this data indication being provided for in the incoming call message, such data indication may be provided in any suitable message communicated from the PSAP entity to the mobile device during the call (i.e. receiving the data indication in a message sent after the traffic channel is established, while the call is in progress).

If both input 710 (i.e. the user input selection) and input 712 (i.e. the data indication in the radio message) are to be utilized for the selection of the talk mode of the mobile device, then logic 708 may be provided. Logic 708 may be provided in the mobile device as hardware or as software which controls the processor. As shown in the example of FIG. 7, logic 708 may be an OR gate or its functional equivalent. Preferably, logic 708 may be adapted to operate in accordance with the truth table provided in Table 4 below:

TABLE 4

Truth Table Logic For Talk Mode.

| User Input Signal From User Input Device | Data Indication From Radio Message | Resulting Talk Mode |
|---|---|---|
| Handset | No Remote Speakerphone Control | Handset |
| Handset | Enable Remote Speakerphone | Speakerphone |
| Speakerphone | No Remote Speakerphone Control | Speakerphone |
| Speakerphone | Enable Remote Speakerphone | Speakerphone |

Although examples have been provided, any suitable type logic may be utilized for the selection of the talk mode of the mobile device.

Thus, although the mobile device may have been dropped, taken from, or otherwise out-of-reach of the end user during the emergency call, continued communications between the PSAP entity and the mobile device may still be effective using the speakerphone talk mode control (e.g. the PSAP entity may at least hear the end user, or at least instruct or otherwise communicate with the end user). Continued communications are also possible when the mobile device configuration may not otherwise allow for it (e.g. see discussion in relation to FIGS. 8*a* and 8*b*).

In an alternate embodiment, the remote control and selection at the mobile device of the automatic answering and talk modes using data indications in the radio messages may be initiated by the PSAP or other third party entity without regard to any emergency call being made by the end user or any disconnection thereof. The call to the mobile device which is made by the entity may merely be a silent or secret, clandestine call (with or without speakerphone talk mode being enabled as described above) which need not be made in response to any disconnected mobile-initiated emergency call. For example, the silent or clandestine call may the made from the entity to the mobile device in response to identifying that the end user of the mobile device is involved in unlawful or illicit behavior. As there is no mobile-initiated call or call disconnection involved in such embodiment, no timer for a time period after disconnection is utilized in the mobile device in this alternate embodiment. Otherwise, the techniques utilized may be the same or similar to those techniques described above. Alternatively, such silent or clandestine call (with or without speakerphone talk mode being enabled as described above) may be made from the entity to the mobile device in response to the entity's receipt of a signal or message (emergency or non-emergency) initiated from the mobile device. Preferably, the message is an emergency message which may be, for example, a short text message (e.g. Short Message Service or SMS message) or an electronic mail (e-mail) message which is received via the user interface of the mobile device by the end user and sent via the wireless network. Such message may be detected as an emergency or non-emergency message with use of the same or similar techniques described above in relation to step 306 of FIG. 3 (i.e. detecting a predetermined code or predetermined user input selection). In this particular alternative embodiment, a timer for a time period following the initial mobile-initiated signal or message may be utilized in the mobile device in the same or similar manner as the time period following emergency call disconnection.

Thus, in the alternative method for use by a mobile communication device for processing incoming calls via a wireless communication network, the steps of the method include monitoring to receive, via the wireless communication network, an incoming call message for an incoming call; receiving a data indication in one or more data fields of the incoming call message; if the data indication indicates that the incoming call message is for silent, automatic answering: refraining from producing an audible alert at the mobile communication device for alerting of the incoming call, and causing the incoming call to be answered automatically by the mobile communication device without detecting a manual answer signal via a user interface of the mobile communication device; or otherwise, if the data indication fails to indicate that the incoming call message is for the silent, automatic answering: refraining from causing the incoming call to be answered automatically by the mobile communication device without detecting the manual answer signal; and in response to detecting the manual answer signal via the user interface, causing the incoming call to be answered.

According to the primary teachings of the present disclosure, methods and apparatus for use in processing disconnected emergency calls and other communications involving mobile communication devices have been described. In one illustrative embodiment, an emergency call with a public safety answering point entity is established by a mobile communication device via a wireless communication network. If the emergency call is disconnected, the mobile device monitors to receive an incoming call message for a continued emergency call from the public safety answering point entity. In response to receiving such incoming call message, the mobile device refrains from producing an audible alert and automatically answers the continued emergency call from the public safety answering point entity without detecting any manual answer signal via its user interface. In one specific approach, the mobile device answers the call automatically if the incoming call message is received within a time period following the disconnection and a data indication of the incoming call message indicates that the message is for the continued emergency call or automatic answering. Otherwise, if the incoming call message is received outside of the time period following the disconnection, or if the data indication fails to indicate that the incoming call message is for the continued emergency call or the automatic answering, the mobile device refrains from automatically answering the call associated with the incoming call message.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method in a mobile communication device configured to operate using a wireless communication network, the method comprising:
 establishing an emergency call with a public safety answering point entity via the wireless communication network;
 monitoring to receive, at the mobile communication device via the wireless communication network, an incoming call message for an emergency call back within a period of time after disconnection of the emergency call, the incoming call message including data fields having data indications therein, the data indications indicating whether the incoming call message is for emergency call back and automatic answering; and
 wherein if the data indications in the data fields indicate that the incoming call message is for emergency call back and automatic answering, then causing the emergency call back from the public safety answering point entity to be answered automatically by the mobile communication device.

2. The method of claim 1, further comprising:
 if the data indications in the data fields indicate that the incoming call message is for emergency call or automatic answering, then refraining from producing an audible alert at the mobile communication device for alerting of the emergency call back.

3. The method of claim 1, further comprising:
 causing a mobile identifier which identifies the mobile communication device to be transmitted via the wireless communication network for an emergency call for receipt by the public safety answering point entity; and
 wherein the act of receiving the incoming call message comprises receiving an incoming call message addressed to the mobile identifier.

4. The method of claim 1, further comprising:
 after an out-of-coverage condition with the wireless communication network which caused an emergency call involving the mobile communication device to be disconnected, identifying an in-coverage condition with the wireless communication network;
 causing a message to be transmitted to the wireless communication network based on identifying the in-coverage condition; and
 monitoring to receive the incoming call message for the emergency call back after causing the message to be transmitted to the wireless communication network.

5. The method of claim 1, wherein the wireless communication network is operative in accordance with Global System for Mobile communications (GSM) standards and the method further comprises:
 if the data indications in the data fields indicate that the incoming call message is for the emergency call back and the automatic answering, then refraining from performing a DR (ALERT) process and a U7 CALL RECEIVED process in the GSM standards when answering the emergency call back.

6. The method of claim 1, further comprising:
 wherein if the data indications in the data fields indicate that the incoming call message is not for emergency call or automatic answering, then refraining from automatically answering the incoming call.

7. The method of claim 1, wherein a user interface of the mobile communication device comprises a plurality of keys, a speaker, and a microphone, and wherein the act of causing the emergency call back to be answered automatically by the mobile communication device comprises the further acts of enabling the speaker to produce audible signals from the public safety answering point entity and enabling the microphone to receive audible signals at the mobile communication device.

8. The method of claim 2, wherein the mobile communication device comprises a memory including a programmable data indication in one or more data fields for setting one of an audible alert answer mode and a silent answer mode for incoming calls to the mobile communication device, and wherein the act of refraining from producing the audible alert at the mobile communication device for alerting of the emergency call back is performed when the programmable data indication indicates that the audible alert answer mode is enabled.

9. The method of claim 1, further comprising:
 after the emergency call back is answered automatically, causing positioning information of the mobile communication device to be sent to the public safety answering point entity.

10. The method of claim 1, wherein the mobile communication device has a handset talk mode and a speakerphone talk mode, and the method comprises the further act of:
 if the data indications in the data fields indicate that the incoming call message is for emergency call back or automatic answering, then enabling the speakerphone talk mode of the mobile communication device without detecting a manual speakerphone activation signal via the user interface.

11. The method of claim 1, wherein the method is embodied in a computer program product comprising a computer readable medium and computer instructions stored in the computer readable medium, the computer instructions being executable by one or more processors for performing the method.

12. A mobile communication device configured to operate using a wireless communication network, the mobile communication device comprising:
a wireless transceiver which is configured for communications via the wireless communication network;
one or more processors coupled to the wireless transceiver;
a user interface coupled to the one or more processors;
the one or more processors being operative to:
  establish an emergency call with a public safety answering point entity via the wireless communication network;
  monitor to receive, via the wireless transceiver, an incoming call message for an emergency call back within a period of time after disconnection of the emergency call, the incoming call message including data fields having data indications therein, the data indications indicating whether the incoming call message is for emergency call back and automatic answering; and
  wherein if the data indications in the data fields indicate that the incoming call message is for emergency call back and automatic answering, then cause the emergency call back from the public safety answering point entity to be answered automatically by the mobile communication device.

13. The mobile communication device of claim 12, wherein the one or more processors are further operative to:
if the data indications in the data fields indicate that the incoming call message is for emergency call back and automatic answering, then refrain from producing an audible alert at the mobile communication device for alerting of the emergency call back.

14. The mobile communication device of claim 12, wherein the one or more processors are further operative to:
after an out-of-coverage condition with the wireless communication network which caused an emergency call involving the mobile communication device to be disconnected, identify an in-coverage condition with the wireless communication network via the wireless transceiver;
cause a message to be transmitted via the wireless transceiver based on identifying the in-coverage condition; and
monitor to receive the incoming call message for the emergency call back after causing the message to be transmitted to the wireless communication network.

15. The mobile communication device of claim 12, wherein the wireless communication network is operative in accordance with Global System for Mobile communications (GSM) standards and the one or more processors are further operative to:
if the data indications in the data fields indicate that the incoming call message is for the emergency call back and the automatic answering, then refrain from performing a DR (ALERT) process and a U7 CALL RECEIVED process in the GSM standards when answering the emergency call back.

16. The mobile communication device of claim 12, wherein the one or more processors are further operative to:
wherein if the data indications in the data fields indicate that the incoming call message is not for emergency call back and automatic answering, then refrain from automatically answering the incoming call by the mobile communication device.

17. The mobile communication device of claim 12, wherein the one or more processors are further operative to:
after the emergency call back is answered automatically, cause positioning information of the mobile communication device to be sent to the public safety answering point entity.

18. The mobile communication device of claim 12, wherein the mobile communication device has a handset talk mode and a speakerphone talk mode, and the one or more processors are further operative to:
if the data indications in the data fields indicate that the incoming call message is for emergency call back and automatic answering, then enable the speakerphone talk mode of the mobile communication device without detecting a manual speakerphone activation signal via the user interface.

19. A wireless communication system, comprising:
a wireless communication network;
one or more mobile communication devices which operate in the wireless communication network;
each mobile communication device being configured to:
  establish an emergency call with a public safety answering point entity via the wireless communication network;
  monitor to receive, via the wireless communication network, an incoming call message for an emergency call back within a period of time after disconnection of the emergency call, the incoming call message including data fields having data indications therein, the data indications indicating whether the incoming call message is for emergency call back and automatic answering; and
  wherein if the data indications in the data fields indicate that the incoming call message is for emergency call back and automatic answering, then cause the emergency call back from the public safety answering point entity to be answered automatically by the mobile communication device.

20. The wireless communication system of claim 19, wherein each mobile communication device is further configured to:
if the data indications in the data fields indicate that the incoming call message is for emergency call back and automatic answering, then refrain from producing an audible alert at the mobile communication device for alerting of the emergency call back.

21. The wireless communication system of claim 19, wherein each mobile communication device is further configured to:
identify an in-coverage condition with the wireless communication network after an out-of-coverage condition with the wireless communication network which caused an emergency call involving the mobile communication device to be disconnected;
cause a message to be transmitted to the wireless communication network based on identifying the in-coverage condition; and
monitoring to receive the incoming call message for the emergency call back after causing the message to be transmitted to the wireless communication network.

22. The wireless communication system of claim 19, wherein each mobile communication device is further configured to:

wherein if the data indications in the data fields indicate that the incoming call message is not for emergency call back or automatic answering, then refrain from automatically answering the incoming call by the mobile communication device.

23. The wireless communication system of claim 19, wherein each mobile communication device is further configured to:

after the emergency call back is answered automatically, cause positioning information of the mobile communication device to be sent to the public safety answering point entity.

24. The wireless communication system of claim 19, wherein each mobile communication device has a handset talk mode and a speakerphone talk mode, and wherein each mobile communication device is further configured to:

if the data indications in the data fields indicate that the incoming call message is for emergency call back and automatic answering, then enable the speakerphone talk mode of the mobile communication device without detecting a manual speakerphone activation signal via the user interface.

25. The method of claim 1, wherein causing the emergency call back from the public safety answering point entity to be answered automatically by the mobile communication device is performed without detecting a manual answer signal via a user interface of the mobile communication device.

26. The method of claim 1, wherein the act of monitoring to receive the incoming message for the emergency call back is performed after an emergency call involving the mobile communication device is disconnected.

27. The method of claim 1, further comprising:

causing an emergency call to be established with a public safety answering point entity via a wireless communication network; and wherein the act of monitoring to receive the incoming message for the emergency call back is performed after the emergency call is disconnected.

28. The mobile communication device of claim 12, wherein the one or more processors are further operative to cause the emergency call back from the public safety answering point entity to be answered automatically by the mobile communication device without detecting a manual answer signal via the user interface.

29. The mobile communication device of claim 12, wherein the one or more processors are further operative to monitor to receive the incoming message for the emergency call back after an emergency call involving the mobile communication device is disconnected.

30. The mobile communication device of claim 12, wherein the one or more processors are further operative to:

cause an emergency call to be established with a public safety answering point entity via a wireless communication network; and monitor to receive the incoming message for the emergency call back after the emergency call is disconnected.

\* \* \* \* \*

UNITED STATES PATENT AND TRADEMARK OFFICE
CERTIFICATE OF CORRECTION

PATENT NO. : 7,933,581 B2
APPLICATION NO. : 11/760120
DATED : April 26, 2011
INVENTOR(S) : Wijayanathan et al.

It is certified that error appears in the above-identified patent and that said Letters Patent is hereby corrected as shown below:

In section 75 (Inventors), change "Weigle" to --Weigele--.

Signed and Sealed this
Twenty-fourth Day of January, 2012

David J. Kappos
*Director of the United States Patent and Trademark Office*